SEMIHARD MAGNETIC MATERIAL

Filed Jan. 4, 1971 6 Sheets-Sheet 1

SEMIHARD MAGNETIC MATERIAL

Filed Jan. 4, 1971

6 Sheets-Sheet 4

Aug. 22, 1972 ZENZO HENMI ET AL 3,686,042

SEMIHARD MAGNETIC MATERIAL

Filed Jan. 4, 1971 6 Sheets-Sheet 6

United States Patent Office 3,686,042

Patented Aug. 22, 1972

3,686,042

SEMIHARD MAGNETIC MATERIAL

Zenzo Henmi and Tatsuji Sasaki, Kawasaki-shi, Yuji Matsui, Yokohama-shi, and Harumi Maegawa, Yoshihiro Sato, Tsuneyasu Gotoh, and Masahiro Komatsu, Kawasaki-shi, Japan, assignors to Fujitsu Limited, Kawasaki, Japan Continuation-in-part of application Ser. No. 766,539, Oct. 10, 1968. This application Jan. 4, 1971, Ser. No. 103,850

Claims priority, application Japan, Oct. 13, 1967, 42/66,036

Int. Cl. C22c *19/00;* H01f *1/00*

U.S. Cl. 148—31.55 4 Claims

ABSTRACT OF THE DISCLOSURE

This invention provides a semihard magnetic material having a coercive force of 10–15 oe. (oersted) and in which the ratio between remanence and saturation magnetization (hereafter referred to as the squareness ratio) is near 1 and which can be used in a semi-permanent memory device such as an electronic exchange or an electronic computer. The invention relates to a semihard magnetic material of a new composition. The composition includes 78–95% Co, 0.2–3% Be, a small amount of deoxidizer and Fe as the last constituent. The coercive force is made 10–50 oe. by an appropriate heat treatment and working process.

This is a continuation-in-part application of application Ser. No. 766,539, filed Oct. 10, 1968 and now abandoned.

This invention provides a semihard magnetic material having a coercive force of 10–50 oe. (oersted) and in which the ratio between remanence and saturation magnetization (hereafter referred to as the squareness ratio) is near 1 and which can be used in a semi-permanent memory device such as an electronic exchange or an electronic computer.

A 90% Co (cobalt)/10% Fe (iron) alloy is well known as a semihard magnetic material. This material is disclosed, for example, by D. H. Wenny, Jr., and H. L. B. Gould in Transactions of the Metallurgical Society of AIME, April 1965, vol. 233, pp. 836–838. The coercive force of this material is 10–15 oe.

A Co/Fe/V alloy including 45–50% Co and a small amount of V (vanadium) is also well known as a semihard magnetic material. An example of this second material is Remendur described in Bell Laboratories Record, June 1965, p. 257. The coercive force of Remendur is between that of Remendur which is a soft magnetic material and that of Vicalloy which is a permanent magnet material.

This invention relates to a semihard magnetic material of a new composition. The composition includes 78–95% Co, 0.2–3% Be (beryllium), a small amount of deoxidizer and Fe as the last constituent. The coercive force is made 10–15 oe, by an appropriate heat treatment and working process. The preferred range of beryllium is $1.3 \leq Be \leq 3\%$.

Figure 1:
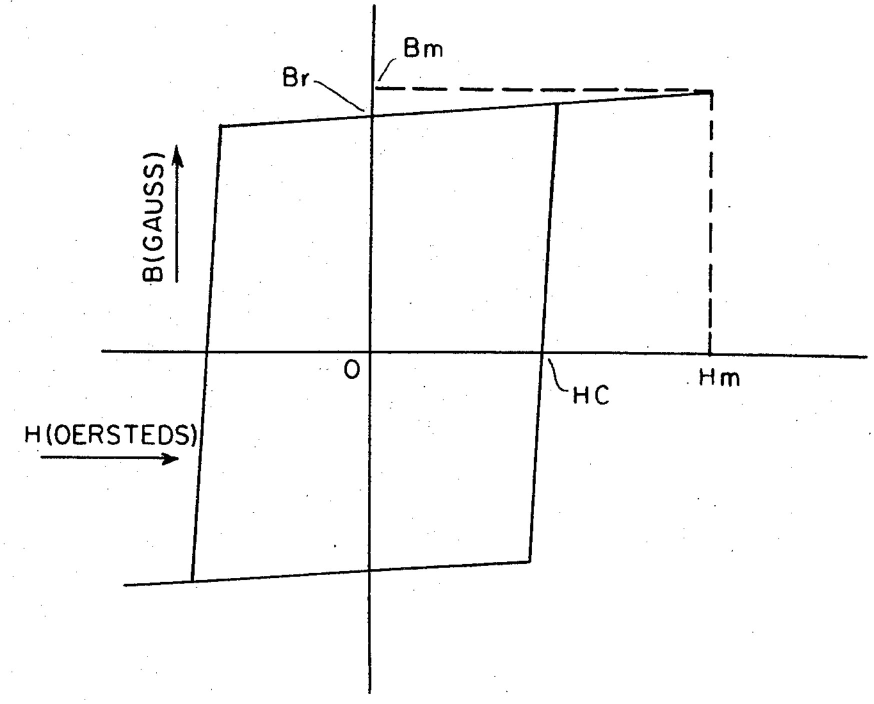

FIG. 1 is a drawing for explaining the square hysteresis loop of a magnetic material, and FIGS. 2, 3, 4, 5, 6, 7, and 8 show the characteristics of semihard magnetic material according to this invention.

FIG. 1 presents a drawing for explaining the square hysteresis loop of a magnetic material. In a semihard magnetic material used in a semi-permanent memory device, it is required that the squareness ratio *Br/Bm* (where B*r* is remanence and B*m* is saturation magnetization) be near 1 and the value of coercive force H*c* can be suitably selected between ten to several tens oe. corresponding to the requirement of the design of the device.

The characteristics of the semihard magnetic material in accordance with this invention will be explained by the following examples.

EXAMPLE 1

An alloy rod comprising 88.5% Co, 0.5% Be, 0.2% Mn (manganese) and 10.8% Fe was melted and cast in vacuum and homogenized. The alloy was processed into a wire of 2 mm. diameter by a swaging machine and a drawing machine, annealing if necessary at 900° C. The wire was then quenched from 900° C. in water and was then drawn into a wire of 0.042 mm. diameter by the drawing machine. The material became hard making it difficult to continue the drawing. It was thus annealed at 900° C. for several seconds when at 0.2 mm. diameter. The wire of 0.042 mm. diameter was rolled into a tape of 0.011 mm. x 0.126 mm. and was finally annealed at 700–900° C. for 10 seconds. The magnetic characteristics of a tape which had not been finally annealed were measured. These characteristics are shown in Table 1.

TABLE 1

| | Not annealed | Annealing temp (° C) 700 | 800 | 900 |
|---|---|---|---|---|
| Coercive force (oersteds) | 16 | 14.5 | 13 | 11.5 |
| *Br/Bm* | 0.88 | 0.87 | 0.85 | 0.84 |

As seen from Table 1, the higher the annealing temperature, the lower the coercive force H*c* and the squareness ratio *Br/Bm.*

EXAMPLE 2

Magnetic characteristics of tapes of 0.011 mm. x 0.126 mm. fabricated by the same method as Example 1 from an alloy rod comprising 88.5% Co, 1.0% Be, 0.2% Mn and 10.3% Fe are shown in Table 2.

TABLE 2

| | Not annealed | Annealing temp (° C) 700 | 800 | 900 |
|---|---|---|---|---|
| Coercive force (oersteds) | 19 | 16.5 | 15 | 12.5 |
| *Br/Bm* | 0.90 | 0.89 | 0.87 | 0.83 |

It can be seen that coercive force H*c* and squareness ratio *Br/Bm* in this case are in general greater than those in Example 1.

EXAMPLE 3

A tape of 0.011 mm. x 0.126 mm. was fabricated by the same method as Example 1 from an alloy rod comprising 88.5% Co, 2.0% Be, 0.2% Mn and 9.3% Fe. The material could not be processed with ease, so it was further annealed at 900° C. for several seconds when it was 0.06 mm. diameter. The magnetic characteristics in this case are as shown in Table 3.

TABLE 3

| | Not annealed | Annealing temp. (° C.) 700 | 800 | 900 |
|---|---|---|---|---|
| Coercive force (oersteds) | 34 | 27.5 | 22.5 | 16.5 |
| *Br/Bm* | 0.95 | 0.94 | 0.92 | 0.85 |

It can be seen that coercive force H*c* and squareness ratio *Br/Bm* in this case are greater than those in Example 2.

EXAMPLE 4

A tape of 0.011 mm. x 0.126 mm. was fabricated by the same method as Example 3 from an alloy rod comprising 88.5% Co, 3.0% Be, 0.2% Mn and 8.3% Fe. It was considerably difficult to process this material and it snapped on the way of wire drawing, so that it was necessary to anneal it more frequently than in the case of Example 3. The magnetic characteristics in this case are as shown in Table 4.

TABLE 4

| | Not annealed | Annealing temp. (° C.) 700 | 800 | 900 |
|---|---|---|---|---|
| Coercive force (oersteds) | 54 | 47 | 40 | 25 |
| *Br/Bm* | 0.97 | 0.97 | 0.96 | 0.86 |

It can be seen that coercive force H*c* and squareness ratio *Br/Bm* in this case are greater than those in Example 3.

Table 5 shows the magnetic characteristics of a tape of 0.011 mm. x 0.126 mm. comprising 88.5% Co, 0.2% Mn and 11.3% Fe and not including Be fabricated by the same methods as Example 1.

TABEL 5

| | Not annealed | Annealing temp (° C.) 700 | 800 |
|---|---|---|---|
| Coercive force (oersteds) | 13.5 | 13 | 12 |
| *Br/Bm* | 0.86 | 0.85 | 0.84 |

As evident from Table 5, coercive force H*c* and squareness ratio *Br/Bm* of a tape not including Be are inferior to those of a tape including Be in accordance with this invention.

Figure 3:
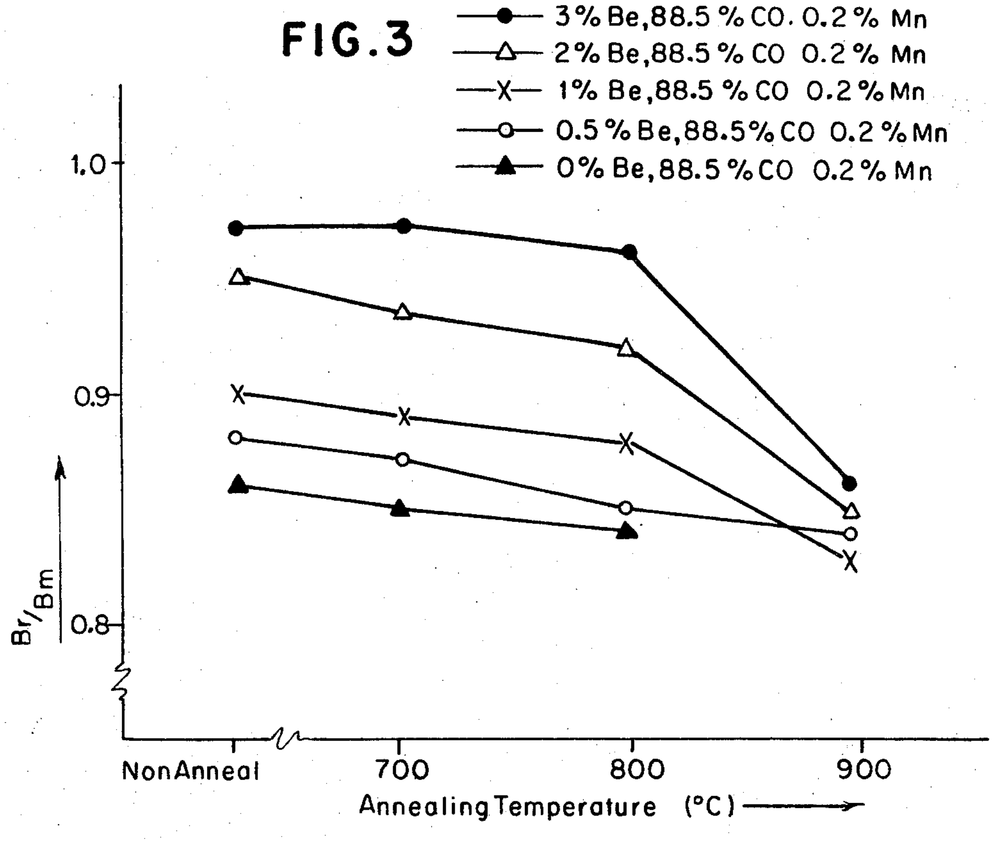
Figure 2:
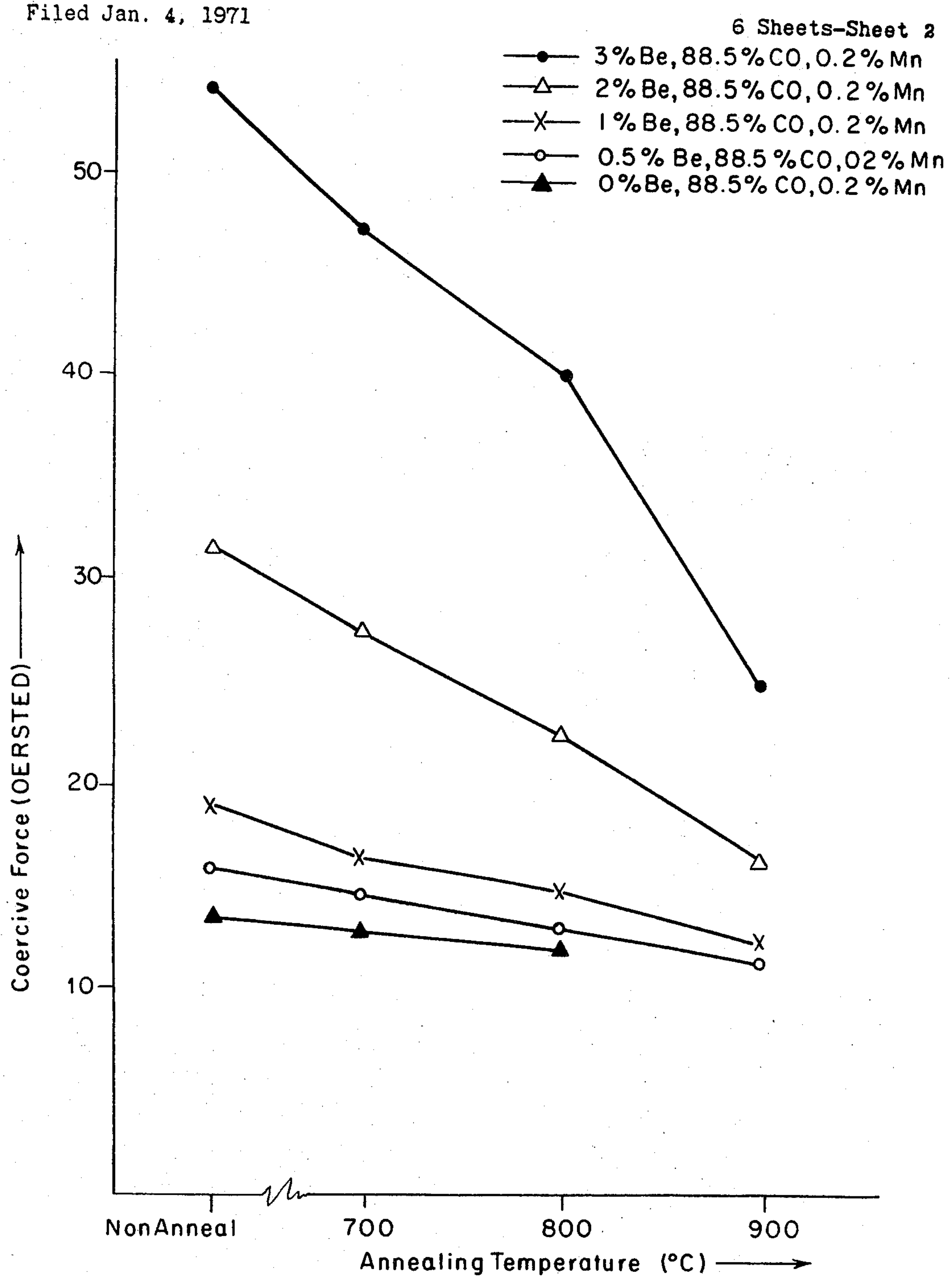

FIGS. 2 and 3 graphically show the data of Tables 1–5. These graphs show that both coercive force H*c* and squareness ratio *Br/Bm* increase in accordance as the amount of Be increases.

In Examples 1–4 above, the alloy rod comprised Co, Be and Fe and a small amount of Mn (0.2%). The next example does not use Mn and the amount of Be and the processing method are slightly different from those in Examples 1–4.

EXAMPLE 5

Four kinds of alloy rods comprising 88.5% Co, respectively 1.7%, 1.3%, 0.7% and 0% Be, and Fe as the third constituent, were melted and cast in vacuum and were processed into wires of 2 mm. diameter by hot-forging, swaging and drawing, annealing of necessary at 900° C. These wires were air cooled from 900° C. after about three minutes annealing and were then drawn into wires of 1 mm. diameter. These wires were further air cooled from 900° C. after about two minutes annealing and were then again drawn into extremely fine wires of 0.042 mm. diameter by drawing machine. The wires were then rolled into tapes of a width of 0.126 mm. and of a thickness of 0.011 mm. These tapes were annealed for ten seconds at 500 to 900° C. and then the magnetic characteristics were measured by a hysteresis loop in an AC magnetic field of a frequency of 10 kHz. and of the maximum exciting field of 50 oe. The results of the measurements are shown in Tables 6–9 and FIGS. 4 and 5. As is evident from FIG. 4, 1.3% beryllium and 1.7% beryllium have a remarkable effect that when the temperature of the final heat treatment becomes higher than 600° C., the slope of the characteristics rapidly ascends. By utilizing such an effect it becomes possible to select the coercive force within a broad range.

TABLE 6 (1.7% Be)

| | Not annealed | Annealing temp. (° C.) 500 | 600 | 700 | 800 | 900 |
|---|---|---|---|---|---|---|
| Coercive force (oersteds) | 34 | 27.5 | 29.5 | 34.5 | 29 | 24 |
| *Br/Bm* | 0.926 | 0.95 | 0.93 | 0.93 | 0.924 | 0.89 |

TABLE 7 (1.3% Be)

| | Not annealed | Annealing temp. (° C.) 500 | 600 | 700 | 800 | 900 |
|---|---|---|---|---|---|---|
| Coercive force (oersteds) | 29.5 | 23 | 24 | 29 | 25 | 21 |
| *Br/Bm* | 0.91 | 0.94 | 0.925 | 0.925 | 0.89 | 0.9 |

TABLE 8 (0.7% Be)

| | Not annealed | Annealing temp. (° C.) 500 | 600 | 700 | 800 | 900 |
|---|---|---|---|---|---|---|
| Coercive force (oersteds) | 20 | 19 | 19.5 | 20.5 | 18 | 14 |
| *Br/Bm* | 0.9 | 0.9 | 0.895 | 0.88 | 0.87 | 0.84 |

TABLE 9 (0% Be)

| | Not annealed | Annealing temp. (° C.) 500 | 600 | 700 | 800 | 900 |
|---|---|---|---|---|---|---|
| Coercive force (oersteds) | 15 | 15 | 15 | 13.5 | 11 | 7.5 |
| *Br/Bm* | 0.865 | 0.865 | 0.86 | 0.855 | 0.84 | 0.8 |

As evident from these tables, the coercive force H*c* increases in accordance as the amount of Be increases. Also, the coercive force of an alloy including Be is increased by annealing at 700° C. Under a temperature of 600° C., the longer the annealing time is, the more the coercive force H*c* increases. For example, when an alloy including Be of 1.3% was annealed at 600° C. for ten seconds and 10 minutes, the coercive force became 24 oe. and 29 oe., respectively. Also, an alloy including Be of a greater percentage has a coercive force of about 20 oe. even if it is annealed 800 to 900° C. When the amount of Be is under 0.2%, the effect on the magnetic characteristic is small and when the amount of Be is above 3%, it becomes extremely difficult to process the material. Therefore the proper amount of Be is 0.2 is 3%, although the preferred amount is 1.3 to 3%. When the material includes a small amount of Mn (up to 1% and preferably about 0.2%) as in the case of Examples 1–4, it is easier to process the material but the presence or absence of Mn has no particular relation to the effect of this invention. Si (silicon) or Al (aluminum) can also be added besides Mn. These act as deoxidizers and have no particular relation to the object and effect of this invention. It was found that the processing method and the annealing method during the processing do not greatly affect the final magnetic characteristic. It is only required to select such condition that breakage during drawing does not occur.

An example in which the amount of Co is varied within the range of 80–91% will be next described.

EXAMPLE 6

Five alloy rods comprising, respectively, 80%, 83%, 86%, 88.5% and 91% Co, 1.3% Be and Fe as the third constituent were melted and cast in vacuum and were fabricated into tapes of a width of 0.126 mm. and of a thickness of 0.011 mm. by the same method as in Example 5. These tapes were heated by the same method as in Example 5 and then the magnetic characteristics were measured. The result of measurement is shown in Tables 10–14 and FIGS. 6 and 7.

TABLE 10 (80% Co)

| Annealing temp. (° C.) | 500 | 700 | 800 | 900 |
|---|---|---|---|---|
| Coercive force (oersteds) | 27 | 32 | 24.5 | 18 |
| *Br/Bm* | 0.78 | 0.92 | 0.915 | 0.91 |

TABLE 11 (83% Co)

| Annealing temp. (° C.) | 500 | 700 | 800 | 900 |
|---|---|---|---|---|
| Coercive force (oersteds) | 24.5 | 27 | 23 | 17.5 |
| Br/Bm | 0.89 | 0.93 | 0.92 | 0.925 |

TABLE 12 (86% Co)

| Annealing temp. (° C.) | 500 | 700 | 800 | 900 |
|---|---|---|---|---|
| Coercive force (oersteds) | 25 | 23.5 | 26.5 | 20.5 |
| Br/Bm | 0.93 | 0.94 | 0.895 | 0.89 |

TABLE 13 (88.5% Co)

| | Not annealed | Annealing temp. (° C.) 500 | 600 | 700 | 800 | 900 |
|---|---|---|---|---|---|---|
| Coercive force (oersteds) | 29.5 | 23 | 24 | 29 | 25 | 21 |
| Br/Bm | 0.91 | 0.94 | 0.925 | 0.925 | 0.89 | 0.9 |

TABLE 14 (91% Co)

| Annealing temp. (° C.) | 500 | 700 | 800 | 900 |
|---|---|---|---|---|
| Coercive force (oersteds) | 26 | 30.5 | 26.5 | 21.5 |
| Br/Bm | 0.905 | 0.905 | 0.91 | 0.915 |

As evident from these tables, the coercive force and the squareness ratio are not greatly varied by the amount of Co. All of the tapes have the squareness ratio of above about 0.9 and can be used as memory elements. When the amount of Co is under 78% and above 95%, it becomes difficult to process the material and manufacture the tape. Therefore, the proper amount of Co is 78 to 95%.

Figure 8:
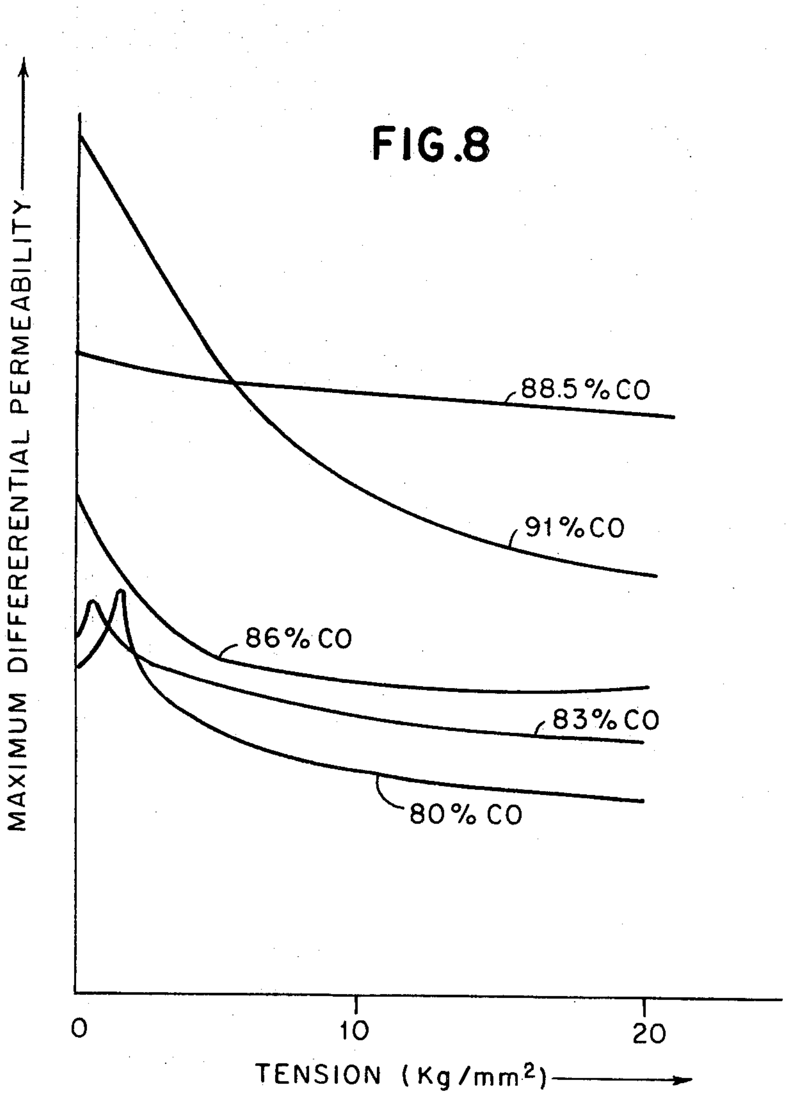

FIG. 8 shows the relationship between the tension applied to five kinds of tapes obtained by the method of Example 6 finally annealed at 800° C. and the maximum differential permeability (tangent of the hysteresis loop near $Hc$ in FIG. 1). As evident from FIG. 8, the maximum differential permeability of the tape of 88.5% Co is scarcely varied even if tension is applied and consequently the shapes of the hysteresis loop are not varied and the magnetic characteristics are very stable. The maximum differential permeabilities of tapes of 80% Co, 83% Co, 86% Co and 91% Co are varied when tension is applied, but in a memory device in which no tension is applied to the tape, the coercive force and the squareness property are excellent as described above and therefore the tape can be used satisfactorily.

As described above, in accordance with this invention, a semihard magnetic material the coercive force of which has an arbitrary value between 10 and 50 oe. and having an excellent squareness can be obtained by properly combining the amount of Be, the amount of Co and the temperature of the final heat treatment.

In this application, all percentages are by weight.

Figure 4:
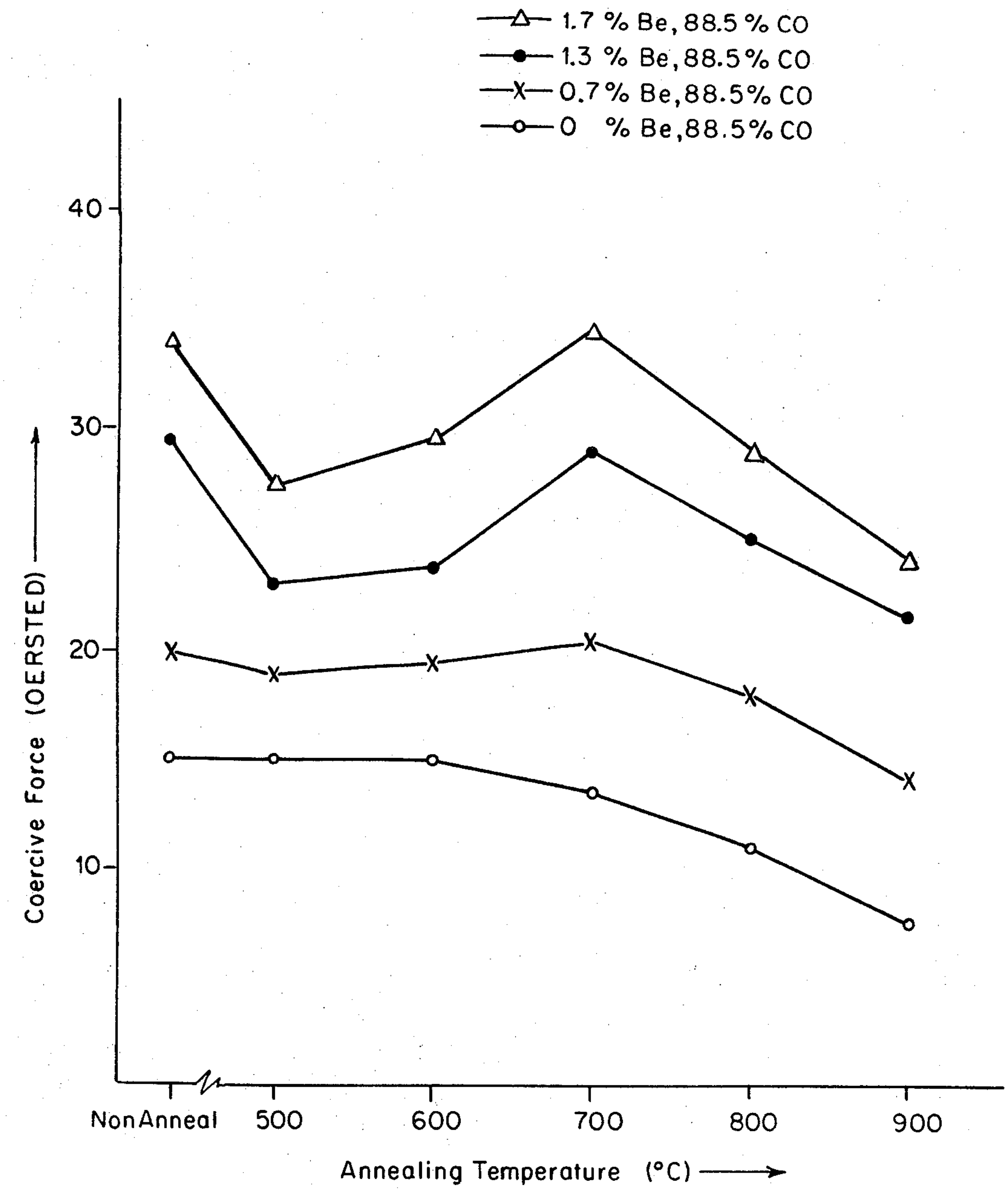
Figure 5:
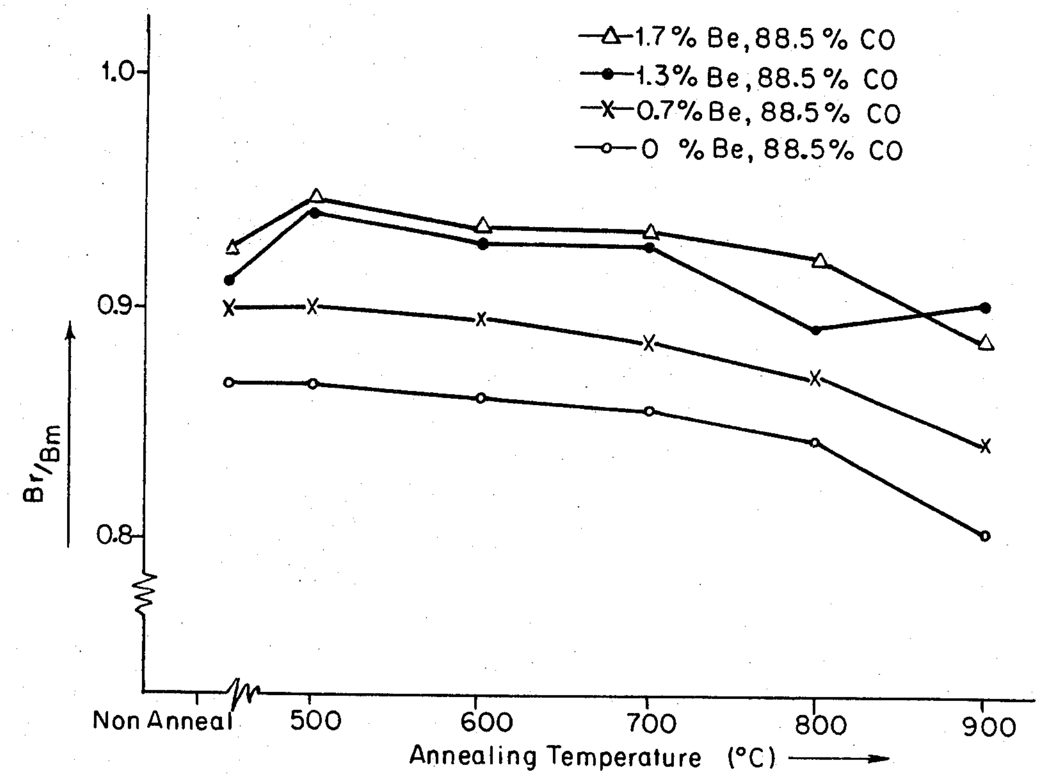
Figure 7:
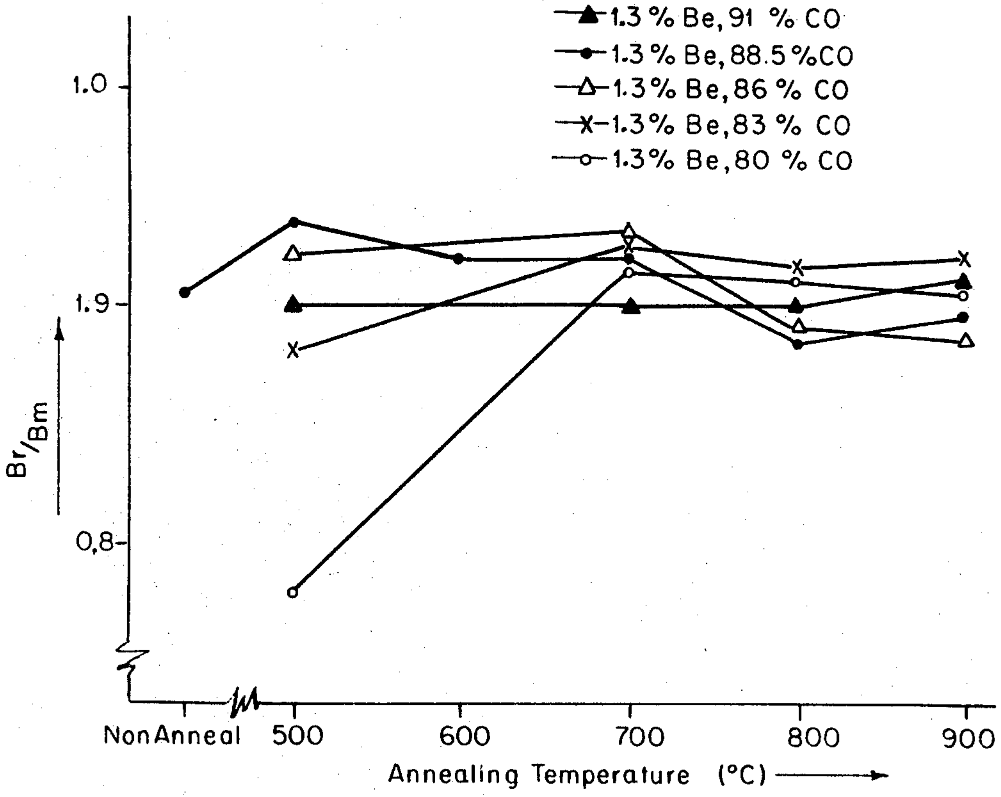
Figure 6:
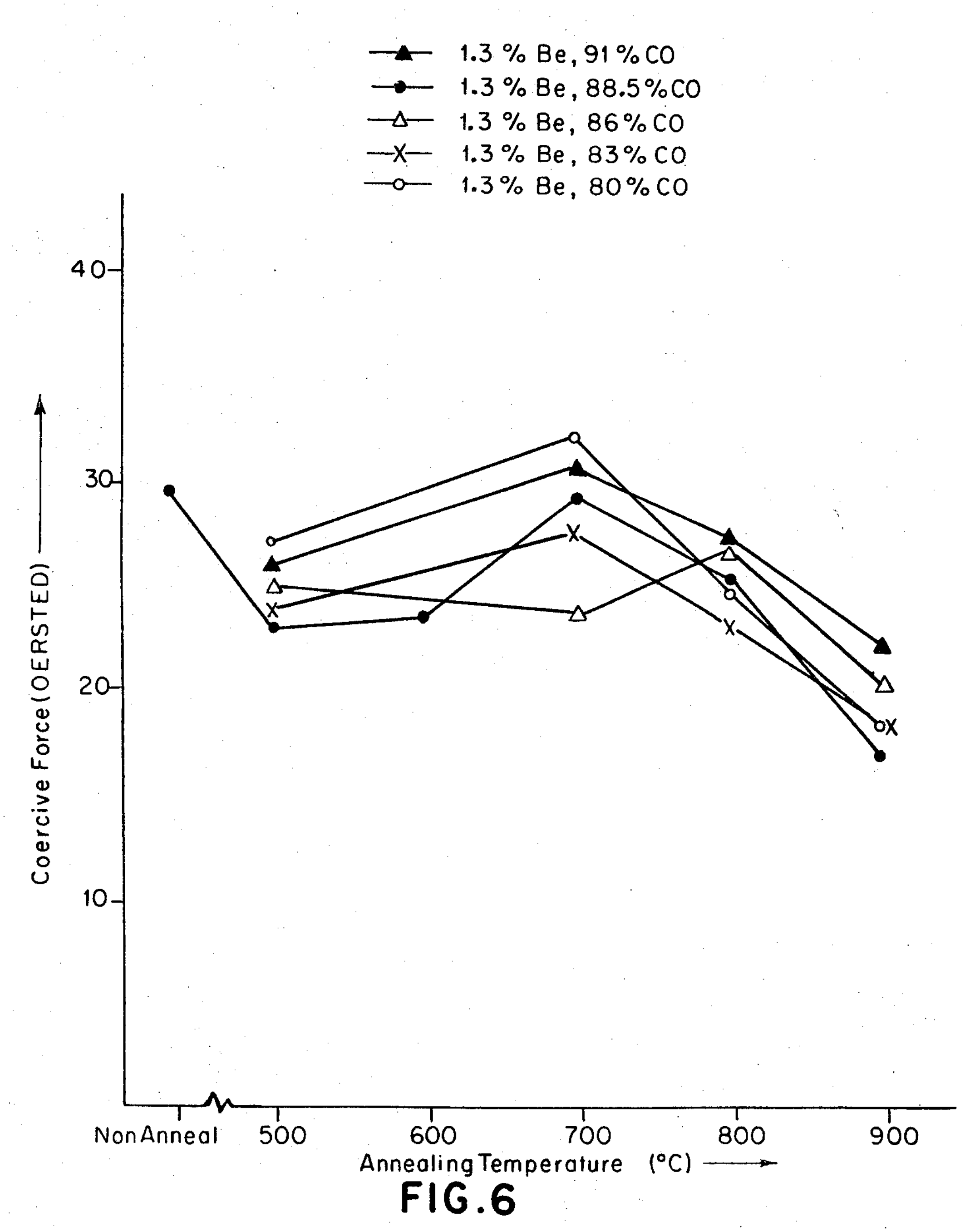

Gould et al., U.S. Pat. No. 3,390,443, describes Be as being added with the purpose to remove S (sulfur) contained in the materials containing no S. In other words, in Gould et al., Be is added only where S requires the addition. In the present invention, on the other hand, Be is added as Co and Fe requires it. As will be seen from FIG. 4 of this invention, the coercive force increases as the amount of Be added increases. Further detailed observation of FIG. 4 shows that after Be exceeds 1.3%, the graph showing the amount of the coercive force forms a considerably large mountain, the peak being arrived at when the annealing temperature is 700° C. It can be considered that this phenomenon occurs owing to the combination of S contained in Fe with Be and the mixing of the remaining Be with Fe and Co. By utilizing this phenomenon, the desired coercive force can be obtained not only by varying the ratio of components of the material but by varying the annealing temperature. Thus, in the magnetic material of this invention wherein Be is within the range of $1.3\% \leqslant Be \leqq 3\%$, the coercive force can be adjusted in the treatment of the material. Gould et al., on the other hand, does not disclose the fact that the coercive force is varied by varying the amount of Be added and does not disclose what phenomenon occurs when Be of an amount more than the amount sufficient to remove S is added. The property available is changed as the amount of Be increases but the property available by more Be is not essentially the same as the property available by less Be, i.e. Be of less than 1.3%. When 1.3% is exceeded, as described above, an unexpected property is exhibited. It will be obvious from the above mentioned that the magnetic material of this invention wherein the coercive force can be selected to a suitable range and of an excellent squareness could not be readily invented from the Gould et al patent. Further, the least upper limit of the amount of Be is 3% since as is seen from FIG. 2, the necessary coercive force can be obtained when the amount of Be is less than 3% and when 3% is exceeded, it becomes extremely difficult to process the material.

What is claimed is:

1. A semihard magnetic material consisting essentially of 78 to 95% cobalt, $1.3\% \leqq$ beryllium $\leqq 3\%$ and the remainder iron.

2. The semihard magnetic material of claim 1, wherein the percentage of cobalt is 88.5.

3. The semihard magnetic material of claim 1, wherein the percentage of cobalt is 91.

4. The semihard magnetic material of claim 1, wherein a small amount of deoxidizer is included.

References Cited

UNITED STATES PATENTS

| | | | |
|---|---|---|---|
| 1,862,559 | 6/1932 | White et al. | 148—121 X |
| 3,189,493 | 6/1965 | Chen | 148—121 X |
| 3,390,443 | 7/1968 | Gould et al. | 148—31.55 X |
| 3,422,407 | 1/1969 | Gould et al. | 148—31.55 X |

L. DEWAYNE RUTLEDGE, Primary Examiner

G. K. WHITE, Assistant Examiner

U.S. Cl. X.R.

75—170; 148—120, 121